United States Patent Office 2,792,406
Patented May 14, 1957

2,792,406

PROCESS OF PREPARING α-LIPOIC ACID USING DICHLOROOCTANOATE AND METAL DISULFIDE

Donald S. Acker, Brookside Park, Del., assignor to E. I. du Pont de Nemours and Company, Wilmington, Del., a corporation of Delaware No Drawing. Application June 1, 1954,
Serial No. 433,800

7 Claims. (Cl. 260—327)

This invention relates to a process for the preparation of intermediates in the preparation of biologically active compounds.

α-Lipoic acid, 5-(1,2-dithiolane-3-yl)pentanoic acid, has been recognized as a B vitamin involved in the biochemical decarboxylation of α-keto acids and as a growth factor for certain microorganisms ("Present knowledge of lipoic acid," Nutrition Reviews 11, 59 (1953)). Since the first isolation and identification of α-lipoic acid from natural sources, several routes for its synthesis by chemical methods have been developed. Bullock et al. (J. Am. Chem. Soc. 74, 1868 (1952)) synthesized α-lipoic acid by a number of chemical steps starting with β-furyl acrolein. Bullock et al. (J. Am. Chem. Soc. 74, 3455 (1952)) also showed the preparation of α-lipoic acid by a number of chemical steps starting with 5-carbethoxyvaleroyl chloride. The copending application of Acker and Todd, Ser. No. 325,236, filed December 10, 1952, now U. S. Patent 2,752,374, discloses a process whereby 6,8-dimercaptooctanoic acid is synthesized, by reductive thiolation of unsaturated compounds of the type of ethyl Δ7,6-ketooctenoate. The copending application of Acker, Ser. No. 325,237, also filed on December 10, 1952, now U. S. Patent 2,752,373, discloses a process whereby 6,8-dimercaptooctanoic acid is synthesized by reductive thiolation of compounds of the type of ethyl 8-acetylthio-6-ketooctanoate. The copending application of Carl S. Hornberger, Jr., Ser. No. 433,281, filed May 28, 1954, discloses a process whereby compounds of the type of 8-chloro-6-ketooctanoic acid are reduced to compounds such as 8-chloro-6-hydroxyoctanoic acid and the use of such latter compounds as intermediates in the preparation of lipoic acid by reactions involving thiocyanates.

This invention has as an object a new process for the preparation of lipoic acid compounds. Other objects will appear hereinafter.

These objects are accomplished by the present invention of a process wherein an alkyl 8-chloro-6-hydroxyoctanoate is converted, by reactive contact with an inorganic acid chloride, to an alkyl 6,8-dichlorooctanoate and this latter is converted to an alkyl lipoate by reactive contact with a soluble metal disulfide. The invention includes within its scope certain elements or subcombinations, i. e., (a) the process step wherein the chlorohydroxyoctanoic acid ester is reacted with the inorganic acid chloride and (b) the process step wherein the dichlorooctanoic acid ester is reacted with the soluble metal disulfide.

In a preferred embodiment of this invention an alkyl ester of 8-chloro-6-hydroxyoctanoic acid is treated with thionyl chloride in the presence of pyridine. The alkyl 6,8-dichlorooctanoate which forms is isolated and then treated with an alcoholic solution of sodium disulfide. The alkyl ester of 5-(1,2-dithiolane-3-yl)-pentanoic acid which forms need not be isolated but can be subjected to alkaline hydrolysis, followed by acidification to yield 5-(1,2-dithiolane-3-yl)pentanoic acid.

The following examples in which parts are by weight are illustrative of the invention.

EXAMPLE I

Part A

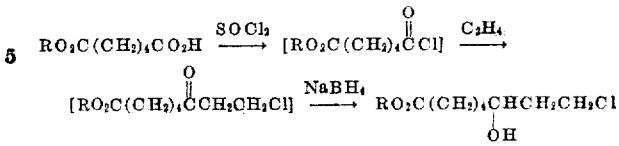

A glass reaction vessel is equipped with a stirrer, thermometer and a condenser leading to a gas absorption tower. In the flask is placed 825 parts of monomethyl adipate (900 parts when the ethyl ester is used), 6400 parts of tetrachloroethane and 700 parts of thionyl chloride. With stirring, the reaction mixture is heated so that a reflux temperature is reached at the end of a one-hour period and then is heated at reflux for an additional one-half hour. During this time there is an evolution of hydrogen chloride and sulfur dioxide which greatly diminishes in volume during the reflux period. The reflux condenser is replaced by a still head and 200 parts of distillate is collected. The mixture is cooled to room temperature.

The condenser is replaced with a powder funnel and 1360 parts of anhydrous aluminum chloride is added while stirring the mixture at 20–25° C. The first 453 parts is added in approximately 4 minutes to prevent precipitation of a complex. The powder funnel is replaced by a gas inlet tube leading below the surface of the solvent. Through this tube is passed a rapid stream of ethylene for a period of 2 hours, while the temperature of the reaction is maintained at 25±5° C. At the end of this time the reaction mixture is poured into a rapidly stirred mixture of 6,000 parts of finely crushed ice and 1,000 parts concentrated hydrochloric acid. The mixture is stirred for 10 minutes. The aqueous phase is removed from the heavier organic layer which is then washed with three portions (3,000 parts each) of water and two portions (3,000 parts each) of dilute (5%) sodium bicarbonate solution.

The resulting organic solution (containing the alkyl 8-chloro-6-ketooctanoate) which is at a pH of about 7.5 is cooled to 10° C. or below while a solution of 60 parts of sodium borohydride in 1,200 parts of 2B alcohol is added over a period of 30 minutes. The reaction mixture is stirred at room temperature for 1.5 to 2 hours and then made acid (pH 1 to 2) with concentrated hydrochloric acid (120 parts). The mixture is washed with three portions (3,000 parts each) of water, and the organic layer is treated with 150 parts sodium bicarbonate and 100 parts anhydrous magnesium sulfate. After filtration to remove the solids, the solution is concentration in vacuo at 20 mm. Hg and up to 100° C. The crude material is fractionally distilled to give 826.8 parts (77%) of methyl 8-chloro-6-hydroxyoctanoate, B. P. 123–125° C./0.45 mm.; $n_D^{25}=1.4607$–18.

When monoethyl adipate (900 parts as indicated above) is used as the starting material in this preparation, the product is ethyl 8-chloro-6-hydroxyoctanoate which distills at 129–132° C./0.35 mm. Hg; $n_D^{25}=1.4583$.

Part B

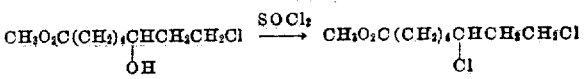

A solution of 31 parts of methyl 8-chloro-6-hydroxyoctanoate in 13.5 parts of pyridine is treated with 24 parts of thionyl chloride with ice-bath cooling. After standing at room temperature overnight, this mixture is heated at 70° C. for 2 hours and then poured into a mixture of 200 parts of ice and water. The product is extracted with benzene and dried over anhydrous potassium carbonate and magnesium sulfate. Distillation gives 19.24 parts (56.5%) of methyl 6,8-dichlorooctanoate, B. P. 88–96° C./0.17–0.30 mm. Hg, $n_D^{25}=1.4538$–40.

*Analysis.*—Calculated for $C_9H_{16}Cl_2O_2$: C, 47.59; H, 7.10; Cl, 31.22. Found: C, 47.78; H, 7.19; Cl, 31.45.

*Part C*

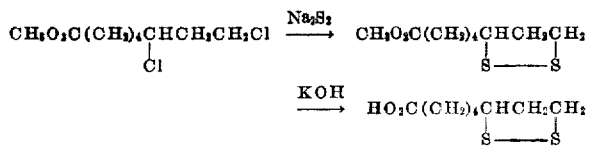

In a glass reactor fitted with a reflux condenser and a nitrogen bubbler are placed 30 parts of crystalline sodium sulfide, 4.0 parts of sulfur and 200 parts of ethanol. The reactor is heated with steam until the solids dissolve. A solution of 18.1 parts of methyl 6,8-dichlorooctanoate in 40 parts of ethanol is added slowly to this solution through the top of the reflux condenser.

This mixture is then heated under reflux for 5 hours. At the end of this period a solution of 12 parts of potassium hydroxide in 250 parts of water is added and the heating is continued overnight. After cooling to room temperature, the solution is made acid with concentrated hydrochloric acid and extracted with three portions (88 parts each) of benzene. The benzene is removed in vacuo and the product is distilled to give the following fractions:

1. 170–190° C./1.8–2.0 mm. Hg ___ 0.65 part.
2. 194–196° C./2.5 mm. Hg _____ 6.62 parts, M. P. 53–50° (40%).
3. 195–180° C./2.5 mm. Hg. _____ 3.24 parts.

The total crude yield is 10.51 parts (64%). Recrystallization from cyclohexane gives 7.85 parts (48%) of lipoic acid, M. P. 58–59° C. which has appropriate full activity in the pyruvate oxidase assay. (A modification of the procedure of I. C. Gunsalus et al., J. Biol. Chem., 194, 849 (1952) using dried cells.) Comparison of the infrared absorption spectrum of this product with that of natural lipoic acid confirms its identity.

EXAMPLE II

A solution of 417.4 parts of methyl 8-chloro-6-hydroxyoctanoate in 180 parts of dry pyridine is stirred well at 0–30° C. while adding 300 parts of thionyl chloride. The resulting solution is stirred at 40° C. for one hour and then heated slowly to 70° C. over another hour. After cooling, the mixture is poured into 3000 parts of ice and water, the oil layer separated and the aqueous layer extracted with three portions (350 parts each) of benzene. The combined organic layers are washed with 500 parts of water, 1000 parts of 10% sodium bicarbonate and then another 500 parts of water. The benzene solution is dried over 100 parts of anhydrous potassium carbonate and then the benzene is removed in vacuo. The product is distilled through a short column to give 43.1 parts of forerun and 358.7 parts of methyl 6,8-dichlorooctanoate which boils over the range 102–110° C./1.0–1.5 mm. Hg; $n_D^{25}=1.4627$ to 1.4643. If ethyl 8-chloro-6-hydroxyoctanoate (482.3 parts) is used for the starting material, the product is ethyl 6,8-dichlorooctanoate, B. P. 114–120° C./1.0–1.3 mm. Hg; $n_D^{25}=1.4610$.

In a glass reactor fitted with a reflux condenser, mechanical stirrer and a nitrogen bubbler are placed 300 parts of crystalline sodium sulfide, 40 parts sulfur and 2000 parts 95% ethanol. The reactor is heated with steam until the solids dissolve. A solution of 227.1 parts of the methyl 6,8-dichlorooctanoate in 400 parts of 95% ethanol is added over a 5-hour period to this refluxing solution through the top of the reflux condenser. After the addition is complete, 800 parts of solvent is removed by distillation and then a solution of 80 parts of sodium hydroxide in 2500 parts of water is added and the heating is continued overnight. The resulting solution is cooled and acidified with concentrated hydrochloric acid. The oil layer is removed and the aqueous layer extracted with two portions (350 parts each) of benzene. The organic layers are combined and extracted with 500 parts of water. The aqueous layer may contain polymeric lipoic acid as a precipitate. This polymer may be separated and dissolved in aqueous sodium bicarbonate and reduced with sodium borohydride to yield 6,8-dimercaptooctanoic acid. The benzene layer is concentrated in vacuo and the residue distilled through a vapor bath still (vapor temperature 197°) at 0.5–1.0 mm. Hg to give 140.8 parts of lipoic acid which crystallizes upon cooling to room temperature. Ethyl 6,8-dichlorooctanoate and other lower alkyl esters of said acid serve equally as well as the methyl ester in this preparation of lipoic acid.

In the process of the present invention α-lipoic acid, 5-(1,2-dithiolane-3-yl)pentanoic acid, is prepared from an alkyl 8-chloro-6-ketooctanoate in three steps or subcombinations. In the first step the alkyl 8-chloro-6-ketooctanoate is converted to the corresponding alkyl 8-chloro-6-hydroxyoctanoate by alkali metal borohydride reduction. In the second step the alkyl 8-chloro-6-hydroxyoctanoate is converted to the corresponding alkyl 6,8-dichlorooctanoate by the action of, i. e., by reactive contact with, an inorganic acid chloride, e. g., $SOCl_2$, $PCl_3$, $PCl_5$, $POCl_3$, etc. Best yields are obtained when this step of the process is carried out under anhydrous conditions. The presence of an organic solvent is not essential. The time required to bring this step of the reaction to completion can be greatly shortened by the presence of an acid acceptor, such as pyridine, one of the picolines, α-pinene and the like. It is postulated that the conversion represented by this second step may proceed through the formation of an intermediate (such as a 6-chlorosulfinate when thionyl chloride is used) which is decomposed into the 6-chloro derivative (by the action of the acid acceptor) as rapidly as it is formed. A chemical equivalent amount of the inorganic acid chloride is required for this reaction. The action of the acid acceptor is catalytic and its use, while desirable, is not essential. The catalytic function of the acid acceptor is confirmed by the fact that catalysis is observed when a hydrochloride of an acid acceptor, i. e., pyridine hydrochloride, is used. When the acid acceptor, if employed, is a liquid, it is often convenient to employ it in excess over the amount required for catalysis to serve as a solvent or a diluent for the reaction.

In the third step or subcombination of the process of this invention, the alkyl 6,8-dichlorooctanoate is reacted with a soluble binary metal disulfide, e. g., a disulfide of lithium, sodium, potassium, rubidium or cesium. A solution or suspension of an alkaline earth metal disulfide such as calcium disulfide may also, but less preferably, be employed. The preferred alkali metal disulfides have the formula $M_2S_2$ wherein M stands for the monovalent alkali metal. These disulfides are readily and conveniently available in solution form but are difficult of isolation. Since for the purposes of this invention isolation is unnecessary, the reaction with the disulfide is usually carried out in solution, for example, in water or in an alcohol. The alkali metal disulfides react more rapidly with alkyl 6,8-dichlorooctanoates in alcohol solution and the alcohols are therefore preferred as solvents. It is further recognized that these disulfides, when in solution, are in equilibrium with the corresponding monosulfide and the various polysulfides of the alkali metal. However, in the process of the present invention it has been found that alkyl 6,8-dichlorooctanoates react with the disulfide of the alkali metal, and it is substantially immaterial what proportions of the other sulfides are present except as they tend, by a shift in the equilibrium, to replace the disulfide used up in the process of the present invention.

In α-lipoic acid [5-(1,2-dithiolane-3-yl)pentanoic acid]

the carbon atom at position 3 of the dithiolane ring is asymmetric. In the ordinary course of chemical synthesis using the process of the present invention, the alkyl 8-chloro-6-hydroxyoctanoate used as a starting material is a DL mixture, and the alkyl 6,8-dichlorooctanoate and the lipoic acid obtained therefrom are likewise DL mixtures. Resolution of DL-lipoic acid to obtain either the D- or the L-enantiomorph is a very difficult chemical procedure. However, it is a very particular advantage of the present invention that the intermediate ester of 8-chloro-6-hydroxyoctanoic acid is much more readily separated into its D and L forms than is lipoic acid itself or its esters.

For example, DL-8-chloro-6-hydroxyoctanoic acid may be reacted (by means of its carboxyl group) with optically active brucine, strychnine, cinchonidine and the like or by transesterification with optically active bornyl alcohol, menthol, etc., to obtain mixtures of the respective pairs of diastereoisomers which are separated by fractional crystallization. From these fractions the corresponding optical isomers of 8-chloro-6-hydroxyoctanoic acid may be regenerated.

Alternatively an alkyl 8-chloro-6-hydroxyoctanoate may be reacted (through the hydroxyl group) with l-menthoxyacetyl chloride, l-menthyl isocyanate, d- or l-camphorsulfonyl chloride and the like and the resulting mixtures of the respective pairs of diastereoisomers separated by fractional distillation or fractional crystallization. Hydrolysis of these fractions yields the corresponding optical isomers of 8-chloro-6-hydroxyoctanoic acid.

When a D-8-chloro-6-hydroxyoctanoic ester is reacted with an inorganic acid chloride according to the present invention, there is otained the corresponding optical isomer of the 6,8-dichlorooctanoic ester from which the corresponding optical isomer of the lipoic acid ester is prepared by reaction with an alkali disulfide. Similarly, a L–8-chloro-6-hydroxyoctanoic ester yields the enantiomorphic forms of 6,8-dichlorooctanoic acid ester and lipoic acid ester.

The alkyl 8-chloro-6-hydroxyoctanoates while primarily useful as intermediates in the preparation of lipoic acid are themselves also of use in the preparation of polymers by ester interchange, with elimination of alkanol, using an ester interchange catalyst such as litharge. In this, as in the lipoic acid utility, the lower (one to five carbon) alkyl esters are preferable inasmuch as the alkyl group is of but minor importance in the lipoic acid esters and is eliminated in polyester formation. The alkyl, preferably lower alkyl 6,8-dichlorooctanotes are of primary utility in lipoic acid synthesis. While dextrorotatory lipoic acid is of prime biological significance both d- and l-forms are of use as rancidity inhibitors for drying oils as set forth in the copending application Ser. No. 369,239, filed July 20, 1953, by N. E. Searle, now U. S. Patent 2,706,158.

While longer chain alkyl esters, e. g., octadecyl 8-chloro-6-hydroxyoctanoate and 6,8-dichlorooctanoate can be employed in the combination and subcombinations of this invention they afford little if any advantage over the lower alkyl esters.

The lower alkyl esters of 8-chloro-6-hydroxyoctanoic acid and 6,8-dichlorooctanoic acid can be saponified to the respective acids which acids can be esterified with lower alkanols to give the lower alkyl esters. In view of the ready interconvertibility the acids and the lower alkyl esters are for most purposes equivalent.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. In a process for the preparation of α-lipoic acid the step wherein a lower, one to six carbon, alkyl 6,8-dichlorooctanoate is reacted with an alkali metal disulfide.

2. In a process for the preparation of α-lipoic acid the step wherein methyl 6,8-dichlorooctanoate is reacted with an alkali metal disulfide.

3. In a process for the preparation of α-lipoic acid the step wherein 6,8-dichlorooctanoic acid is reacted with an alkali metal disulfide.

4. A process for the preparation of α-lipoic acid wherein a lower alkyl 8-chloro-6-hydroxyoctanoate is reacted with thionyl chloride, the resultant lower alkyl 6,8-dichlorooctanoate is isolated therefrom and reacted with an alkali metal disulfide and the resulting lower alkyl ester of 5-(1,2-dithiolane-3-yl)pentanoic acid is isolated and saponified to the acid.

5. A process for the preparation of α-lipoic acid wherein a lower alkyl 8-chloro-6-ketooctanoate is reduced by means of an alkali metal borohydride to the corresponding lower alkyl 8-chloro-6-hydroxyoctanoate, said lower alkyl 8-chloro-6-hydroxyoctanoate is reacted with thionyl chloride, the resultant lower alkyl 6,8-dichlorooctanoate is isolated therefrom and reacted with an alkali metal disulfide and the resulting lower alkyl ester of 5-(1,2-dithiolane-3-yl)pentanoic acid isolated and saponified to the acid.

6. In a process for the preparation of alpha lipoic acid, the step wherein a lower alkyl 8-chloro-6-ketooctanoate is reduced by means of an alkali metal borohydride to the corresponding lower alkyl 8-chloro-6-hydroxyoctanoate.

7. The process wherein the lower alkyl 8-chloro-6-hydroxyoctanoate is resolved by esterification, including transesterification, into its D and L forms.

References Cited in the file of this patent

UNITED STATES PATENTS 2,530,348    Britton et al. _____ Nov. 14, 1950
2,655,521    Ladd et al. _____ Oct. 13, 1953

OTHER REFERENCES

Bullock et al.: J. Am. Chem. Soc., 74:1868–1869 (1952).

Webster's International Dictionary, 1939 edition, page 1194.

Hornberger: J. A. C. S., 75:1273–1277 (1953).

Beilstein: 19:1 (1934) (main work) 19:452 (1952) (2nd suppl.).

Bullock: J. A. C. S., 75:1828–1832 (1954).

UNITED STATES PATENT OFFICE

CERTIFICATE OF CORRECTION

Patent No. 2,792,406 May 14, 1957

Donald S. Acker

It is hereby certified that error appears in the printed specification of the above numbered patent requiring correction and that the said Letters Patent should read as corrected below.

Column 2, line 63, beneath the arrow in the formula insert -- $C_5H_5N$ --; column 3, line 31, for "53-50°" read -- 53-59° --; column 4, line 63, for "alcohol" read -- alcoholic --; column 5, line 34, for "otained" read -- obtained --; line 50, for "6,8-dichlorooctanotes" read -- 6,8-dichlorooctanoates --; column 6, line 62, list of references cited, under the heading "OTHER REFERENCES", for "75" read -- 76 --.

Signed and sealed this 10th day of September 1957.

(SEAL)
Attest:

KARL H. AXLINE
Attesting Officer

ROBERT C. WATSON
Commissioner of Patents